Jan. 15, 1957 R. F. SCHWEGLER 2,777,376
TRACTOR MOUNTED RELEASABLE IMPLEMENT
Filed Dec. 27, 1951 4 Sheets-Sheet 1

INVENTOR
Roy F. Schwegler
BY
ATTORNEY

Jan. 15, 1957   R. F. SCHWEGLER   2,777,376
TRACTOR MOUNTED RELEASABLE IMPLEMENT
Filed Dec. 27, 1951   4 Sheets-Sheet 2
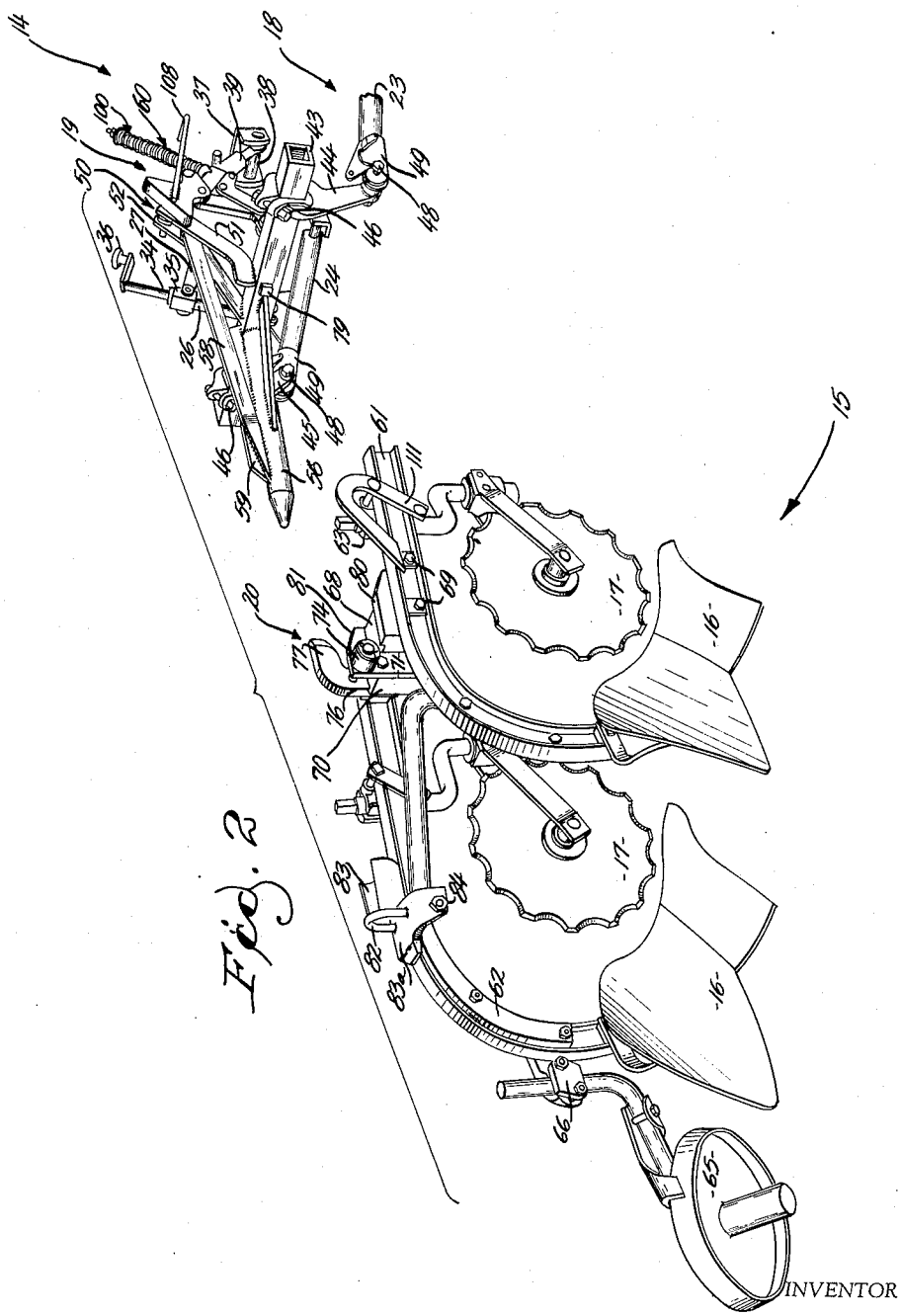
INVENTOR
ROY F. SCHWEGLER
BY
ATTORNEY Jan. 15, 1957     R. F. SCHWEGLER     2,777,376
TRACTOR MOUNTED RELEASABLE IMPLEMENT
Filed Dec. 27, 1951     4 Sheets-Sheet 3
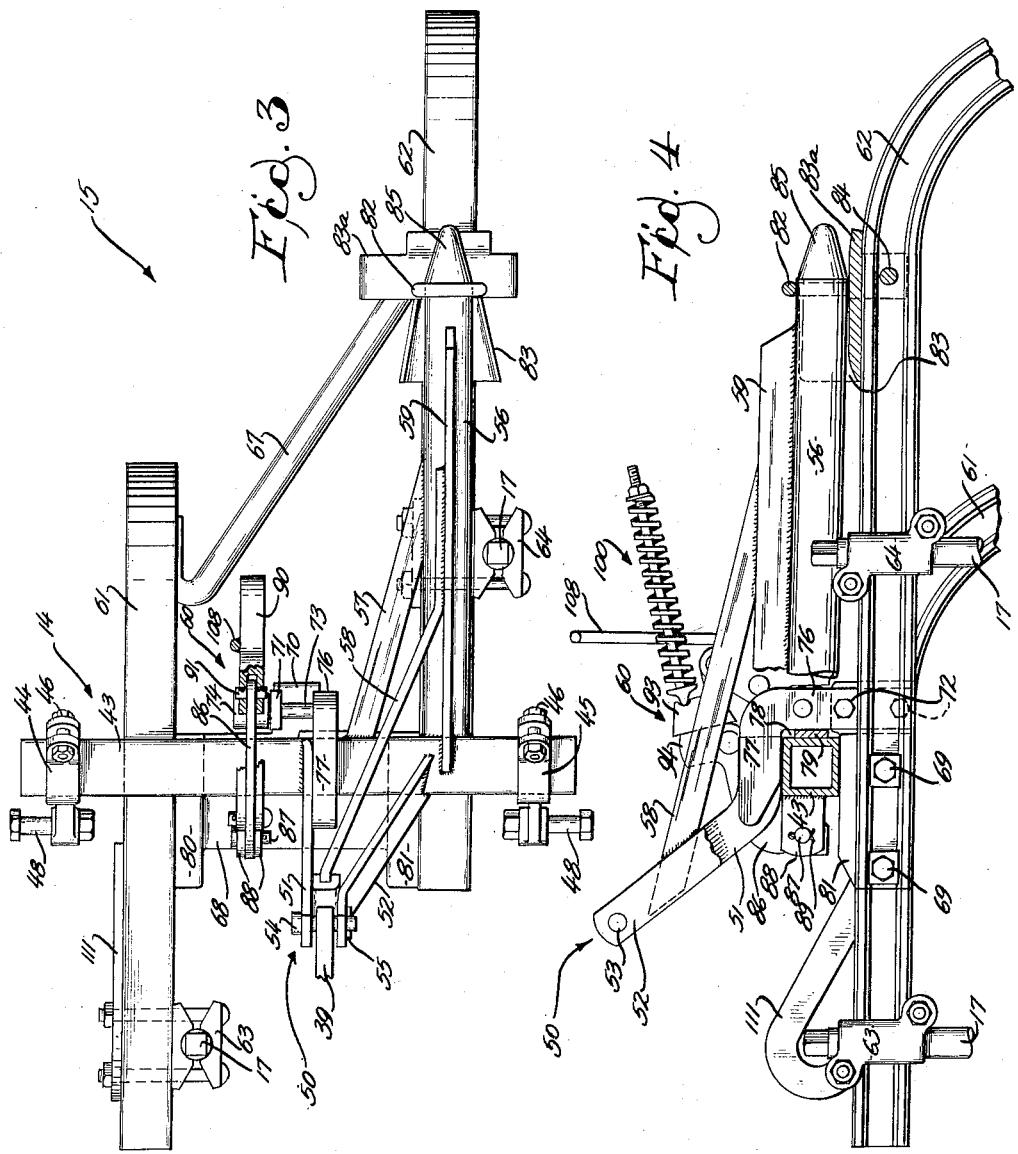
INVENTOR
ROY F. SCHWEGLER
BY
ATTORNEY

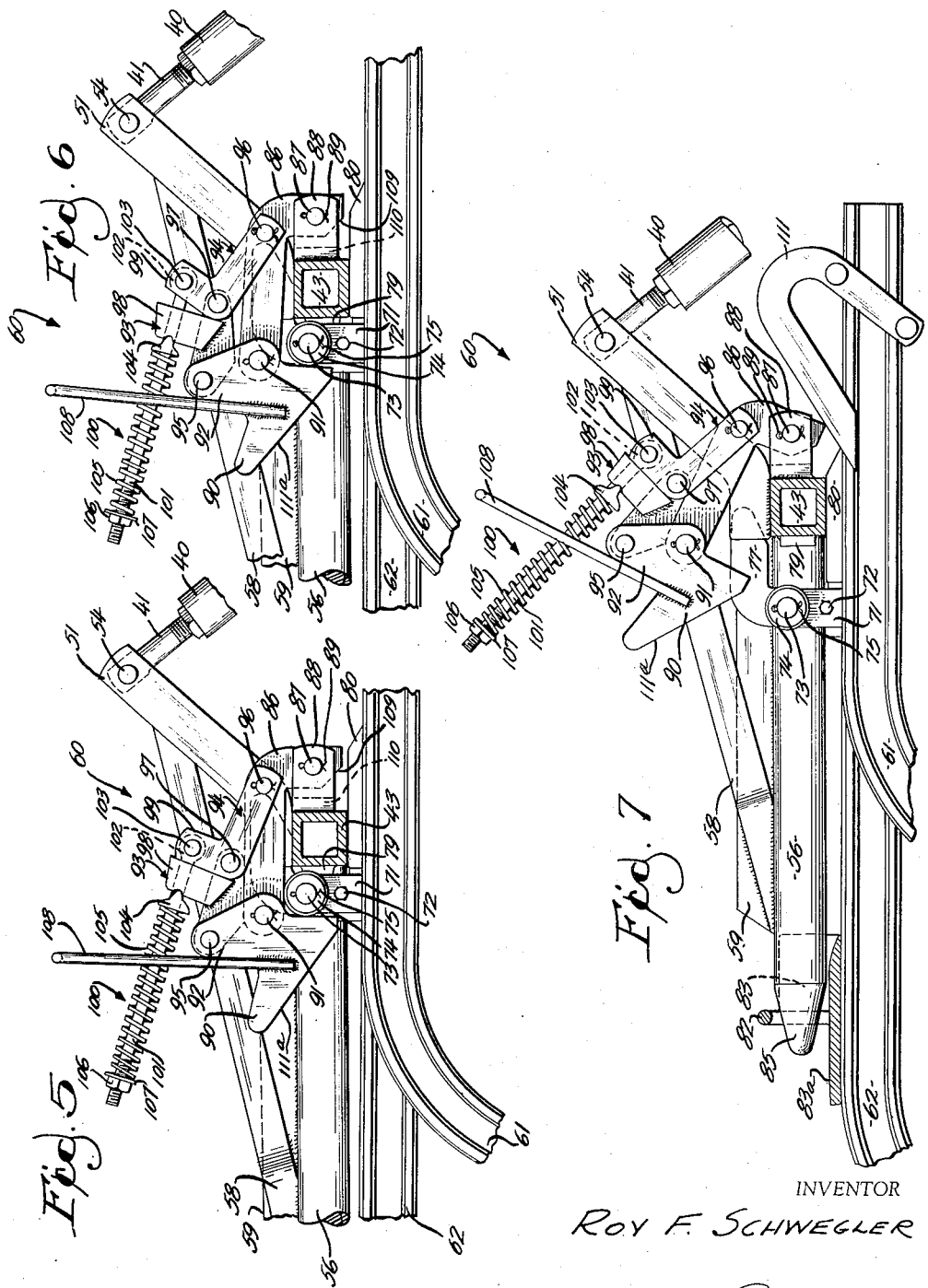

United States Patent Office 2,777,376
Patented Jan. 15, 1957

2,777,376

TRACTOR MOUNTED RELEASABLE IMPLEMENT

Roy F. Schwegler, Rock Island, Ill., assignor to J. I. Case Company, Racine, Wis., a corporation of Wisconsin Application December 27, 1951, Serial No. 263,618

11 Claims. (Cl. 97—47.14)

The present invention relates generally to tractor-mounted implements and is more particularly concerned with tractor-mounted plows.

The object and general nature of the present invention is the provision of a tractor-mounted implement which is particularly designed for quick and easy connection with and disconnection from the tractor. Specifically, it is a feature of this invention to provide a plow which can be quickly and easily connected to the tractor and which is capable of being lifted or tilted with respect to the horizontal, said connection being responsive to the draft force required to move the plow bottom through the ground and being releasable when the force required to move the plow bottom through the ground exceeds a predetermined force. Further, it is a feature of this invention to provide a two-element plow, one of the elements being carried by the tractor for up-and-down or tilting movement, and the other element carrying ground working tools connected to the first element for up-and-down movement and tilting movement in accordance with such movement as is imparted to the first element, one of said connections being releasable when the force required to move the plow bottom through the ground exceeds a predetermined force, and the other connections being simultaneously releasable upon relative longitudinal movement in one direction between the first element and the second element.

These and other objects and advantages of the present invention will be apparent to those skilled in the art after a consideration of the following description taken in conjunction with the accompanying drawings in which the preferred form of the present invention has been illustrated.

In the drawings:

Fig. 2 is a view with parts removed similar to Fig. 1, showing the implement after a "break-away" has occurred.

Fig. 3 is a plan view of the implement shown in Fig. 1, enlarged somewhat and with parts removed.

Fig. 4 is a left-side elevational view of the implement shown in Fig. 3, with parts broken away to more clearly show details of construction.

Fig. 5 is a right-side elevational view of certain structure shown in Fig. 3, showing the inter-engaging means when the plow is in an operative condition.

Fig. 6 is a view similar to Fig. 5 showing the inter-engaging means at the moment of impact between the implement and an immovable object.

Figure 1:
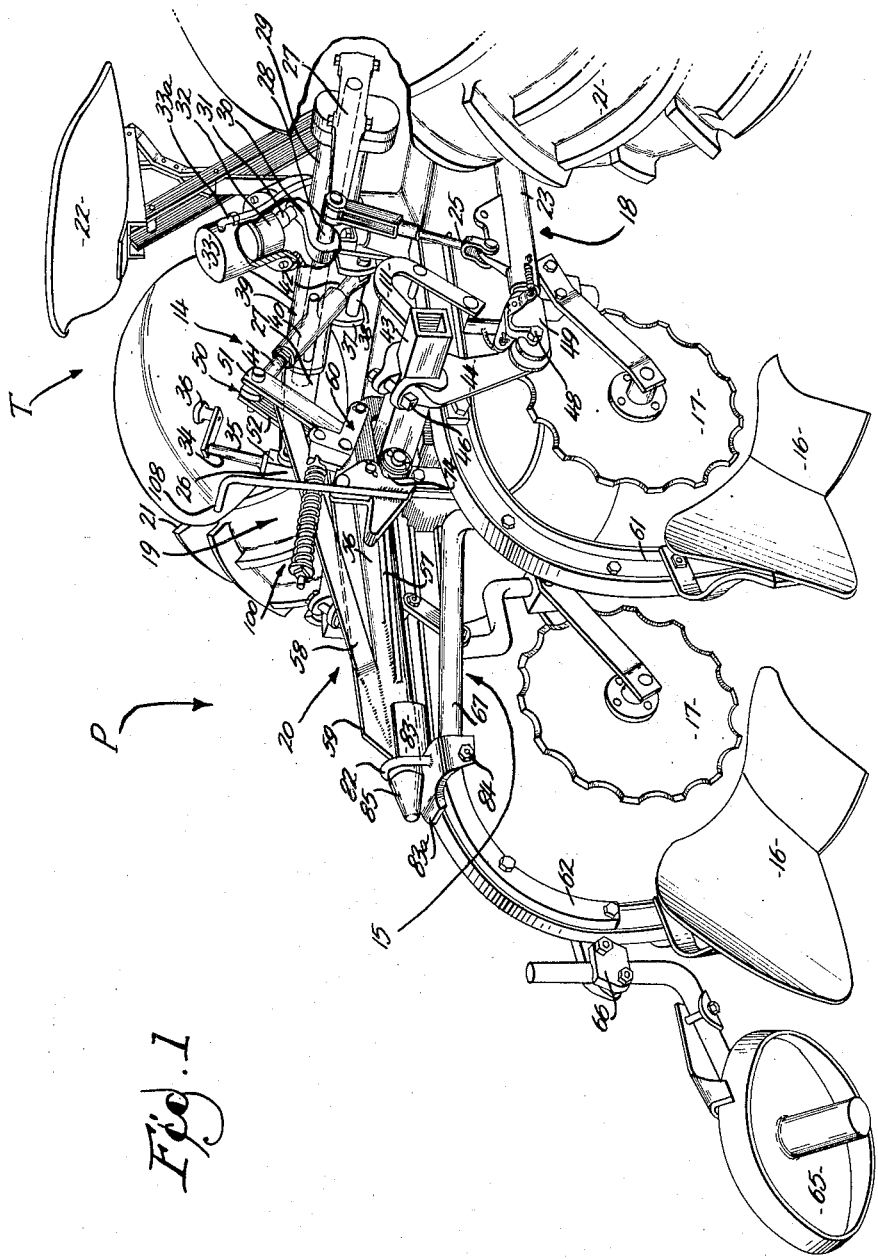
Fig. 1 is a right-rear perspective view of an implement embodying the present invention mounted on a tractor and with parts broken away to more clearly show details of construction.

And Fig. 7 is a view similar to Fig. 5 showing the relationship of the parts immediately after a "break-away" has occurred.

The present invention is shown as being embodied in an agricultural implement such as a plow P which is adapted to be mounted on a tractor T which is associated with the plow. The plow P can be considered as being formed of two subframes, designated number 14 and 15 respectively, the subframe 15 carrying the usual plow bottoms 16 and coulters 17 and the subframe 14 being adjustably carried or mounted by a draft and lifting linkage generally designated 18 which is a part of the tractor T. The sub-frame 14 in combination with the draft and lifting linkage 18 will also be considered as a draft and lifting connection between the sub-frame 15 and the tractor whereby the plow P will be capable of being draft-connected to the tractor T and tilted sufficiently to compensate for the tilt of the tractor when the same is in operation as will be more fully appreciated hereinafter. The subframe 15 is adapted to be draft connected or inter-engaged with the subframe 14 by means of suitable inter-engaging means designated as 19, said inter-engaging means being responsive to the force required to move the plow bottoms 16 through the ground and being releasable upon the attainment of a predetermined load. Suitable interlocking means 20 are provided between the subframe 15 and the subframe 14 for stabilizing the subframe 15 with respect to the subframe 14 for permitting up-and-down movement and tilting of the subframe 15 in accordance with such movement as is imparted to the subframe 14, the interlocking means being instantaneously releasable upon relative longitudinal movement in one direction between the respective subframes as will be clearly explained hereinafter.

More specifically the tractor T can be of any suitable or conventional construction and preferably comprises in the present instance an engine or power source, a transmission, and a rear axle housing enclosing a rear axle assembly, all of the above not being visible in the drawings and the details of which form no part of the present invention. Rear traction wheels 21 are provided on opposite ends of the rear axle assembly and an operator's seat 22 is positioned between the traction wheels as well known in the art.

The draft and lifting linkage 18 as previously suggested is considered as a part of tractor T and is preferably of the type shown and described in the application of Clarke S. N. 165,066, filed May 29, 1950, and described hereinafter. However, it will be understood that the present invention is not limited in any way to a tractor employing only the type linkage shown and described in the above mentioned patent application. The linkage 18 includes rearwardly extending hitch or draft arms 23 and 24, preferably of tubular construction, which are respectively supported from the rear axle housing of the tractor for free swinging movement into raised or lowered positions in substantially vertical planes. The hitch arms 23 and 24 are connected by means of suitable links 25 and 26 respectively to parallel rock arms 27 adjacent the rearward ends thereof, the rock arms 27 being fixed adjacent the opposite ends of a suitable rock shaft 28 rotatably enclosed in a housing 29. The rock shaft 28 has fixed thereon a forwardly and upwardly extending rock arm 30 which receives adjacent the end thereof a suitable piston rod 31. The piston rod 31 receives a suitable piston 32 which is slidable in a cylindrical housing 33 extending upwardly from the housing 29, the rock shaft 28 being rocked in one direction upon actuation or movement of the piston 32 in housing 33 by reasons of suitable fluid power's being delivered into the housing 33 by way of a suitable conduit 33a from a hydraulic power system under the control of the operator and in a manner not shown since it forms no part of the present invention. Such a system is shown and described in the application of Talek S. N. 165,077, filed May 29, 1950. The rock shaft 28 upon being rocked by fluid power delivered into cylindrical housing 33 swings the rock arms 27 upwardly, which upward movement occasions a similar movement to the hitch arms 23 and 24 by reason of the connecting links 25 and 26 respectively. The hitch arms 23 and 24 are biased to swing downwardly, and this downward swinging movement of the respective hitch arms is limited only by the rock shaft 28 which is controlled by the position of the piston 32 in the housing 33.

Link 26 is in the form of an adjustable screw 34 which is threaded into a swivel block 35 carried by its associated rock arm 27. The adjustable screw 34 is provided with a suitable handle 36 which extends forwardly to within convenient reach of the operator when the operator is positioned at his station 22 on the tractor so that the operator by turning handle 36 in either direction can swing hitch arm 24 in either direction independently of hitch arm 23 as will be more fully explained hereinafter.

A suitable bracket 37 is fixed to the rock shaft housing 29 substantially intermediate the ends thereof and a pin 38 swingably supports a middle link 39 in the bracket 37 for swinging in a substantially vertical plane and for permitting substantially or modified vertical lifting movement of an implement attached thereto and to the respective hitch arms 23 and 24 upon the hitch arms being swung upwardly as well known in the art. The middle link 39 is adjustable in length employing a turn buckle 40, a threaded element 41 and a threaded element 42 so as to permit the operator from his position on the tractor to lengthen or shorten the middle link for well-known purposes.

The subframe 14, which can be considered as a part of plow P or as a part of tractor T as previously suggested, is of fabricated construction and comprises in the present instance a transverse draft beam 43, preferably of tubular construction and substantially square in cross section, which has downwardly depending brackets 44 and 45 clamped adjacent the opposite ends thereof by means of suitable bolts 46. The depending brackets 44 and 45 have laterally extending bolts or trunnions 48 rigidly fixed adjacent the lower ends thereof, and the respective brackets 44 and 45 are so clamped on the draft beam 43 as to position the trunnions 48 in a position to be received by suitable attaching claws 49 secured adjacent the ends of the respective hitch arms 23 and 24 and preferably of the type shown and described in the application of Seeburger, S. N. 164,970, filed May 29, 1950, now Patent No. 2,681,813, dated June 22, 1954. Substantially intermediate draft beam 43 is provided an upwardly and forwardly extending mast 50 which is fabricated from spaced apart members 51 and 52 secured as by welding or the like to the draft beam 43. Aligned openings 53 are formed adjacent the upper ends of the respective members 51 and 52 and the respective members are spaced apart adjacent their upper ends so as to receive therebetween the middle link 39. The middle link 39 is secured between the members 51 and 52 by means of a suitable locking pin 54 which is received by the openings 53 and a suitable opening formed in the middle link, and a cotter pin or the like 55 is provided for locking the pin 54 against displacement out of the openings formed in the middle link and mast in a manner will known in the art. Laterally of mast 50 adjacent one end of draft beam 43 is secured as by welding or the like a rearwardly extending pilot shaft 56 which is braced against movement in the horizontal plane by means of a stabilizing member 57 welded or similarly secured between the pilot shaft and the draft beam 43 and in the vertical plane by means of a stabilizing member 58 welded or the like between the pilot shaft and the member 51 of the mast 50. The pilot shaft 56 is further braced in the vertical plane by means of a rib 59 which is welded or suitably secured to the draft beam 43 and the pilot shaft along the length thereof. The pilot shaft 56 aids in stabilizing the subframe 15 against sideward swinging movement with respect to the subframe 14 besides stabilizing the subframe 15 with respect to the subframe 14 causing tilting of the subframe 15 in accordance with tilting of the subframe 14 when the plow P is in an operative condition as will be more fully described and appreciated hereinafter.

Laterally of the other side of mast 50 is carried the interengaging means 19 which is in the form of a releasable latch 60 which as will appear hereinafter draft connects the subframe 15 to the subframe 14 and which is so constructed as to release the subframe 15 from the subframe 14 when the force required to move the plow bottoms 16 through the ground exceeds a predetermined amount.

The subframe 15 is also of fabricated construction and includes in the present instance a pair of spaced apart plow beams 61 and 62 which are downwardly curved adjacent their rearward ends for having attached thereto the plow bottoms 16 in any suitable or well known manner. The coulters 17 are supported by means of suitable clamps 63 and 64 respectively from the respective plow beams 61 and 62 forwardly of the plow bottoms 16 in the usual manner, and a conventional furrow wheel construction 65 is attached adjacent the rearward end of plow beam 62 by means of a suitable attaching bracket 66 for aiding in controlling the plow when the plow is in operation, in a manner well known in the art. The forward ends of the plow beams 61 and 62 are parallel and are rigidly interconnected by means of a diagonal brace 67 and a forwardly positioned transverse brace member 68, brace member 68 being in the form of a casting in the present instance and being rigidly secured between the plow beams 61 and 62 by means of suitable bolts or the like 69.

The member 68 has formed thereon a rearwardly extending attaching portion 70, and an upwardly extending supporting member 71 is secured to one side thereof as by suitable bolts 72. The member 71 extends upwardly sufficiently to be in substantially the plane of the draft beam 43 when the plow is in an operative position and supports adjacent the upper end thereof a transverse pin 73 which extends laterally therefrom. A roller 74 is received on the pin 73 and is locked in position by means of a suitable cotter pin or the like 75, and the roller is so positioned as to be in longitudinal alignment with the releasable hitch 60 for draft receiving the hitch so as to draft connect the subframe 15 to the subframe 14 as previously suggested and as will be explained presently. On the opposite side of portion 70 is secured by means of bolts 72 an upwardly extending hook-like member 76 having a forwardly extending portion 77 and a throat portion 78. An abutment 79 is welded to the rear of the draft beam 43 so that when the draft beam is operatively positioned with respect to the subframe 14 to be draft connected thereto, the abutment pad 79 will be received in the throat portion 78 sufficiently to abut the forward surface of member 76. Runners 80 and 81 are formed on the casting 68 in spaced relationship adjacent the respective ends thereof and are so positioned as to support the draft beam 43 thereupon when the draft beam is received in the throat portion of the hook 76, the vertical space between the runners 80 and 81 and the under surface of portion 77 of the hook 76 being so calculated as to readily receive the draft beam 43 therebetween while still snugly holding the draft beam when received therein so as to substantially prevent tilting of the subframe 15 except in accordance with tilting of the subframe 14.

A socket 82 is carried rearwardly on plow beam 62 and in longitudinal alignment with the pilot shaft 56 when the subframe 15 is properly positioned with respect to the subframe 14, and the socket is so positioned on the plow beam 62 to receive the pilot shaft 56 therein adjacent the rearward end thereof. The socket is provided with a flared funnel or guide 83 for directing the pilot shaft into the socket 82, and the socket is carried on a suitable bracket 83a which is adjustably secured to the plow beam 62 by means of a suitable adjusting screw 84. As will be more fully appreciated hereinafter, the socket 82 can be moved sideways in either direction by turning the adjusting screw 84 for shifting or off-setting the subframe 15 in either direction with respect to the subframe 14 so as to correct the side draft of the plow. The proper side draft of the plow is determined by experimentation, and after the operator has determined the proper position of the subframe 15 with respect to the subframe 14 when the plow is in a draft position, the socket 82 is left in this adjusted position. For further aiding the pilot shaft 56 to be easily received in the socket 82, the rearward end thereof is tapered as designated at 85.

The socket 82 is so formed as to snugly receive the pilot shaft 56 therein. It will be appreciated therefore that the pilot shaft 56 when received in the socket 82 aids in stabilizing the subframe 15 with respect to the subframe 14 for causing tilting and or lifting of the subframe 15 in accordance with tilting and or lifting of the subframe 14.

The releasable latch 60 includes in the present instance a downwardly arched member 86 which is swingably secured by means of a transverse pin 87 carried between forwardly extending brackets 88 welded or the like to the draft beam 43, see Figs. 5 and 6. A cotter pin 89 is provided for locking the pin 87 against axial movement out of the brackets 88. A trigger 90 receives the rearward end of arm 86, see Fig. 3, is swingably secured thereto by means of a suitable pin or the like 91 and the trigger 90 is so positioned on the arm 86 to draft engage the abovementioned roller 74 when the arm 86 is swung sufficiently rearward, the draft beam 43 being properly received between the hook 76 and the runners 80 and 81 and the pilot shaft 56 being received by the socket 82. The trigger 90 is in the from of a bell crank and the upper leg thereof, designated generally as 92, is pivotally connected to the arm 86 by a pair of bell cranks 93 and 94 which forms a toggle arrangement for moving the trigger 90 into a draft engaging position upon the toggle being buckled downwardly. More specifically bell crank 93 adjacent one leg thereof is pivotally received by the upper leg 92 of trigger 90 by means of a suitable pin 95, and the bell crank 94 adjacent one leg thereof is pivotally secured to arm 86 by means of a suitable pin or the like 96. The bell cranks 93 and 94 are pivoted together substantially midway between their ends by means of a suitable bolt 97 and are provided with upwardly extending arms 98 and 99 respectively in abutting relationship so that the bell cranks are capable of buckling upwardly about bolt 97, but not downwardly, the abutting arms 98 and 99 serving as stops for limiting downward buckling of the toggle arrangement.

For normally maintaining the trigger 90 in the position shown in Figure 5, a spring arrangement 100 is connected to bell crank 94 and includes in the present instance a bolt 101 provided with an eye 102 at one end thereof which is pivotally connected to arm 99 by means of a suitable bolt 103. A spring seat 104 is provided on the bolt 101 and a coiled spring 105 is fitted on the spring seat 104 and extends rearwardly around the bolt 101. The spring is confined by means of a suitable nut 106 threaded on the end of the bolt 101 and a washer 107 so that the spring is placed under compression. It will be appreciated that the expansion force of the spring 105 tends to maintain the bell cranks 93 and 94 in the position shown wherein arms 98 and 99 respectively are in abutting relationship for preventing downward buckling of the toggle arrangement. The arrangement is such that the centers of the pivotal connections 95, 96, and 97 are sufficiently out of alignment to permit the bell crank toggle arrangement 93 and 94 to buckle upwardly when the force applied against the trigger 90 is sufficient to overcome the force exerted by the expansion of the spring 105, see Figure 6.

To draft connect the subframe 15 to the subframe 14 so as to put the plow P in an operative position, the operator first swings the releasable latch 60 forwardly about the axis of pin 87. To facilitate this swinging movement, a handle 108 is welded to the trigger 90 and extends upwardly sufficiently to be within convenient reach of the operator from his position 22 on the tractor. The under portion of the arm 86 is also provided with a cut out portion 109 which is so positioned as to come into contact with a spacer 110 secured between the brackets 88 so that the releasable latch 60, when swung forwardly and upwardly, can be supported in an upright position. The operator then raises the hitch arms 23 and 24 sufficiently to permit the draft beam 43 to clear the coulter clamp 63 upon rearward movement of the tractor. When the draft beam 43 is clear or rearwardly of the coulter clamp 63, the operator lowers the draft beam into horizontal alignment with the space formed between the runners 80 and 81 and the forwardly extending portion 77 of the hook 76, the pilot shaft 56 being positioned in longitudinal alignment with the socket 82. Upon the operator then backing the tractor sufficiently rearward, the draft beam 43 is pushed into the space formed between the runners 80 and 81 and the hook 76 and the pilot shaft is received in the socket 82 upon the draft beam 43 being moved sufficiently rearward into the throat portion 78 of the hook 76 to move the pad 79 in abutment therewith. The operator then by pushing rearwardly against the handle 108, swings the releasable latch 60 backwardly until the trigger 90 is in draft engaging position with respect to roller 74, the trigger being in a cocked position through the force exerted on the toggle arrangement 93 and 94 by the spring 105. The subframe 15 is now draft connected to the subframe 14 and the operator by permitting the plow to lower itself upon forward movement of the tractor, can move the plow bottoms 16 into the ground a depth established by the share suction of the plow bottoms and the line of draft between the plow bottoms and the tractor. The angle of the face of trigger 90 is such that a line extended normal to the point of contact between it and roller 74 in Fig. 5 would pass above the center of pivot 87 so that the force exerted upon the trigger 90 through the roller 74 when the plow is in operation is in a downward direction. Arm 86 during normal plowing operations therefore does not have a tendency to swing upwardly and forwardly about the axis of pin 87 but is urged definitely downwardly by the forces developed. Also during normal plowing operations the compression force of the spring 105 is so calculated as to prevent upward buckling of the bell cranks 93 and 94 sufficiently to move the trigger 90 into an unlatching position. The proper compression force of spring 105 can best be determined by experiment and will depend upon such things as the depth of plowing, the type and nature of the soil being plowed, the size of the plow, etc. When one of the plow bottoms 16 strikes an immovable object, the forward motion of the subframe 15 stops at the moment of impact and the tractor and consequently the subframe 14 continues to move forward. This resulting force is transmitted against the trigger 90 through the roller 74 and is sufficient to overcome the force exerted by the spring 105. The bell cranks 93 and 94 consequently are caused to buckle upwardly against the force exerted by the spring 105 causing the trigger 90 to swing forwardly as urged by the force exerted by roller 74. When the toggle arrangement has buckled sufficiently, the roller 74 will exert a lifting force on trigger 90, will raise it and snap clear of the trigger 90, see Fig. 7, and the subframe 14 will be free to move forwardly out of engagement with the subframe 15, the pilot shaft 56 and the draft beam 43 being instantaneously releasable upon relative movement longitudinally between the respective subframes.

A coulter guard 111 is secured to plow beam 61 adjacent coulter clamp 63 and is so formed as to force the draft beam 43 to ride over the coulter clamp 63 and the shank of the coulter should a "break away" of the subframe 15 occur. It will be appreciated that failure to provide such a guard would allow the draft beam 43 to strike the clamp 63 and the shank of the respective coulter when a "break away" occurs resulting in damage to the coulter and possible tipping of the subframe 15.

When the trigger 90 is snapped clear of the roller 74, the spring 105 restores the toggle arrangement to its normal cocked position immediately upon the trigger being cleared of the roller 74, the arms 98 and 99 being moved into abutting relationship and serving to limit the swinging of the trigger 90 beyond its proper draft position and to establish the proper amount of misalignment between pivots 95, 96, and 97.

To recouple the subframe 15 to the subframe 14 the operator, without leaving his station on the tractor, need only swing the releasable latch 60 into an upright position by means of handle 108, back the tractor sufficiently to place the draft beam 43 within the space provided between the runners 80 and 81 and the forwardly extending portion 77 of hook 76, the pilot shaft 56 being in longitudinal alignment with the socket 82 and the draft beam 43 being rearwardly of guard 111, then wedge the draft beam into its proper position with respect to the runners 80 and 81 and the hook 76, the pilot shaft 56 being moved into the socket 82. If necessary he may raise or lower draft frame 14 by action of power lift piston 32, as necessary to insure vertical alignment of the parts and then push upon the arm 108 so as to swing the releasable latch 60 rearward sufficiently to draft engage trigger 90 with roller 74. Then by lifting the plow over the obstruction in a manner as previously described, the plowing operation can be continued on the other side of the obstruction or the obstruction can be removed from the field. If the operator prefers he may swing trigger 90 downwardly at any time previous to placing the parts together, an inclined surface 111a on trigger 90 riding over roller 74 and raising the parts so that trigger 90 can drop into place behind roller 74 automatically upon completion of the backing movement.

It being normal for the tractor to run with one tractor wheel in the last previously formed furrow and accordingly tilted to one side, it is usually necessary to adjust the left-hand hitch arm 24 to a lower position in relationship to the tractor than the right-hand hitch arm 23 so that as the tractor tilts the plow will run level. This is accomplished as previously suggested by means of the link 26 which is in the form of an adjustable screw 34 which the operator from his station on the tractor can lengthen sufficiently by turning handle 36 in the proper direction to permit the hitch arm 24 to swing downwardly sufficiently to move the draft beam 43 into a substantially horizontal position when the tractor is tilted. The interlocking means 20 between the subframe 15 and the subframe 14 stabilizes the subframe 15 with respect to the subframe 14 so that the subframe 15 is tilted in accordance with tilting adjustment of the draft beam 43. It will be appreciated that the depth of the furrow is determinative of the amount of tilt imposed on the tractor, and the amount of movement imparted to the hitch arm 24 by means of the adjustable screw 34 in order to move the draft beam 43 into a substantially horizontal plane is completely under the control of the operator from the operator's station on the tractor and while the plow is in operation. As is well known, the amount of tilt of the tractor, and consequently the amount of adjustment will vary with each change in the depth of plowing.

It will be appreciated that when the subframe 15 is draft connected to the subframe 14 in a manner as previously described, that the subframe 15 is held against lateral swinging movement in either direction with respect to the subframe 14. More specifically the subframe 15 is held against lateral swinging movement to the left, as viewed in Fig. 3, by means of the pilot shaft 56 in the socket 82 while the draft beam 43 is received sufficiently within the hook 76 to abut pad 79 with the throat portion thereof. It will be appreciated that the subframe 15 is thereby held against swinging in this direction at two laterally spaced points. Swinging movement of the subframe 15 in the opposite direction is prevented by means of the pilot shaft 56 in the socket 82 and the trigger 90, which is in draft engaging position with respect to the roller 74. The subframe 15 is thereby held against swinging movement in this direction at two laterally spaced points.

Changes in details may be made without departing from the spirit or scope of this invention, and what I claim is:

1. In a tractor mounted plow the combination of a tractor, a plow, a socket carried on said plow, a draft and lifting connection between the tractor and the plow for raising and lowering the plow and for leveling the plow, a latch carried by the draft and lifting connection for engaging said plow when said plow is draft positioned with respect to said draft and lifting connection for propelling the plow by reason of the forward movement of the tractor, said latch being responsive to the force required to move the plow through the ground and being releasable upon the attainment of a predetermined load, said draft and lifting connection including a rearwardly extending pilot shaft in longitudinal alignment with said socket for being received by said socket when said plow is draft connected to said tractor, said pilot shaft being laterally spaced with respect to said latch, and forwardly open means on said plow for snugly receiving said draft and lifting connection between said latch and said pilot shaft for stabilizing the plow with respect thereto for causing tilting of the plow in accordance with adjustment of the draft and lifting connection, said means being instantaneously releasable upon relative longitudinal movement in one direction between the plow and the tractor.

2. In a tractor mounted plow the combination of a tractor, a plow, a socket carried on said plow, a draft and lifting connection between the tractor and the plow for raising and lowering and for leveling the plow, a spring loaded latch carried by the draft and lifting connection and swingable about a transverse axis for engaging said plow when said plow is draft positioned with respect to said draft and lifting connection for propelling the plow by reason of forward movement of the tractor, said latch being responsive to the force required to move the plow through the ground and being releasable upon the attainment of a predetermined load, said draft and lifting connection including a rearwardly extending pilot shaft in longitudinal alignment with said socket for being received therein when said plow is draft connected to said tractor, said pilot shaft being laterally spaced with respect to said latch, and forwardly open means on said plow for snugly receiving said draft and lifting connection between said pilot shaft and said latch for stabilizing the plow against tilting with respect thereto for causing tilting of the plow in accordance with adjustment of the draft and lifting connection, said means being instantaneously releasable upon relative longitudinal movement in one direction between the plow and the tractor.

3. The combination with a tractor having a draft and lifting linkage comprising laterally and vertically spaced rearwardly extending links pivoted thereto for up and down swinging movement, means for raising and lowering said links, and means for raising and lowering one of the links independently of the other links, of a two element plow, one of said elements comprising a draft element having a transverse draft beam connected to certain of said links, a mast extending generally upwardly from said draft beam and connected to the other of said links, said draft beam being constituted to be raised, lowered, or tilted by the before-mentioned means, the other element comprising a plow element and being positioned rearwardly of the first element and having at least one plow bottom carrier thereon and propelled thereby, inter-engaging means between the draft beam and the plow element for draft connecting the plow element to the draft element, said inter-engaging means being releasable when the force required to move the plow bottom through the ground exceeds a predetermined amount, a substantially, longitudinally extending pilot shaft secured to one of said elements and extending toward the other of said elements when the plow element is draft connected to the draft element, a socket on the other side of said elements for snugly receiving said pilot shaft upon said plow element being draft connected to said draft element, said pilot shaft being laterally spaced from said inter-engaging means when said plow element is draft-connected to said draft element, and interlocking means on one of said elements for snugly receiving the other element and positioned between said pilot shaft and said inter-engaging means when said plow element is draft-connected to said draft element for stabilizing said plow element with respect to said draft element for causing tilting of said plow element in accordance with adjustment of said draft beam while permitting tilting of said plow element in accordance with adjustment of said draft beam while still permitting instantaneous separation of the plow element from the draft element when the force required to move the plow bottoms through the ground exceeds a predetermined amount.

4. The combination with a tractor having a draft and lifting linkage comprising laterally and vertically spaced rearwardly extending links pivoted thereto for up and down swinging movement, means for raising and lowering said links, and means for raising and lowering one of the links independently of the other links, of a two element plow, one of said elements comprising a draft element having a transverse draft beam connected to certain of said links, a mast extending generally upwardly from said draft beam and connected to the other of said links, said draft beam being constituted to be raised or lowered or tilted by said before-mentioned means, the other element comprising a plow element and being positioned rearwardly of the first element and having at least one plow bottom carried thereon and propelled thereby, a spring loaded latch carried by said draft beam and swingable into engaging relationship with said plow element for draft connecting said plow element to said draft element, said spring loaded latch being responsive to the force required to move the plow bottom through the ground and being releasable when the force required to move the plow bottom through the ground exceeds a predetermined amount, a substantially longitudinally extending pilot shaft secured to one of said elements and extending toward the other of said elements when the plow element is draft connected to the draft element, a socket on the other of said elements for snugly receiving said pilot shaft upon said plow element being draft connected to said draft element, said pilot shaft being laterally spaced from said latch when said plow element and said draft element are draft-connected, and interlocking means on one of said elements for snugly receiving the other element and positioned between said latch and said pilot shaft when said plow element and said draft element are draft-connected for stabilizing said plow element with respect to said draft element for causing tilting of said plow element in accordance with adjustment of said draft beam while still permitting instantaneous separation of the plow element from the draft element when the force required to move the plow bottoms through the ground exceeds a predetermined amount.

5. The combination with a tractor having a draft and lifting linkage comprising laterally and vertically spaced rearwardly extending links pivoted thereto for up and down swinging movement, means for raising and lowering said links, and means for raising and lowering one of the links independently of the other links, of a two element plow, one of said elements comprising a draft element having a tranverse draft beam connected to certain of said links, a mast extending generally upwardly from said draft beam and connected to the other of said links, said draft beam being constituted to be raised, lowered, or tilted by the before-mentioned means, the other element comprising a plow element and being positioned rearwardly of the first element and having at least one plow bottom carried thereon and propelled thereby, inter-engaging means between the draft beam and the plow element for draft connecting the plow element to the draft element, said inter-engaging means being releasable when the force required to move the plow bottom through the ground exceeds a predetermined amount, a rearwardly extending pilot shaft depending rearwardly from said draft beam, a socket carried by said plow element in longitudinal alignment with said pilot shaft for snugly receiving said pilot shaft when said plow element is draft connected to said draft element, said pilot shaft being laterally spaced from said inter-engaging means when said plow element and said draft element are draft-connected, and interlocking means on one of said elements for snugly receiving the other element and positioned between said inter-engaging means and said pilot shaft when said plow element and said draft element are draft-connected for stabilizing said plow element with respect to said draft element for causing tilting of said plow element in accordance with adjustment of said draft beam while still permitting instantaneous separation of the plow element from the draft element when the force required to move the plow bottom through the ground exceeds a predetermined amount.

6. The combination with a tractor having a draft and lifting linkage comprising laterally and vertically spaced rearwardly extending links pivoted thereto for up and down swinging movement, means for raising and lowering said links, and means for raising and lowering one of the links independently of the other links, of a two element plow, one of said elements comprising a draft element having a transverse draft beam connected to certain of said links, a mast extending generally upwardly from said draft beam and connected to the other of said links, said draft beam being constituted to be raised, lowered, or tilted by the before-mentioned means, the other element comprising a plow element and being positioned rearwardly of the first element and having at least one plow bottom carried thereon and propelled thereby, a spring loaded latch carried by said draft beam and swingable into engaging relationship with said plow element for draft connecting said plow element to said draft element, said spring loaded latch being responsive to the force required to move the plow bottom through the ground and being releasable when the force required to move the plow bottom through the ground exceeds a predetermined amount, a rearwardly extending pilot shaft projecting rearwardly from said draft beam and spaced laterally from said latch, a socket carried by said plow element in longitudinal alignment with said pilot shaft for snugly receiving said pilot shaft when said plow element is draft connected to said draft element, and interlocking means on one of said elements for snugly receiving the other element and positioned between said latch and said pilot shaft when said plow element is draft-connected to said draft element for stabilizing said plow element with respect to said draft element for causing tilting of said plow element in accordance with adjustment of said draft beam while still permitting instantaneous separation of the plow element from the draft element when the force required to move the plow bottom through the ground exceeds a predetermined amount.

7. In a tractor-mounted plow the combination of a tractor, a plurality of spaced links pivoted to the tractor and extending rearwardly therefrom, a transverse member rearwardly of the tractor and carried on and connecting certain of said links to each other, a mast extending generally upwardly from said transverse member and connected to the tractor by the other of said links, a pilot shaft projecting rearwardly from said transverse member, said plow comprising a plow frame, a plow bottom propelled by and supported on said plow frame, a socket on said plow frame positioned to receive said pilot shaft when said tractor is backed into attaching position, inter-engaging means between said transverse member and said plow frame for draft connecting said plow frame to said transverse member, said inter-engaging means being constituted to separate upon relative longitudinal movement between the transverse member and the plow frame in one direction and being releasable upon attainment of a predetermined load, said inter-engaging means being laterally spaced from said pilot shaft when said plow frame is draft-connected to said transverse member, means for raising and lowering said spaced links and means for raising and lowering one of the links connected to said transverse member independently of the other, for tilting said transverse member relatively to the tractor, and forwardly open means on said plow frame for snugly receiving said transverse member and positioned between said pilot shaft and said inter-engaging means when said plow frame is in draft relationship with said transverse member for stabilizing said plow frame for causing tilting of said frame in accordance with adjustment of said transverse member, said means permitting instantaneous relative longitudinal movement between said transverse member and said frame upon the attainement of a predetermined load.

8. In a tractor-mounted plow the combination of a tractor, a plurality of spaced links pivoted to the tractor and extending rearwardly therefrom, a transverse member rearwardly of the tractor and carried on and connecting certain of said links to each other, a mast extending generally upwardly from said transverse member and connected to the tractor by the other of said links, a pilot shaft projecting rearwardly from said transverse member, said plow comprising a plow frame, a plow bottom propelled by and supported on said plow frame, a socket on said plow frame positioned to receive said pilot shaft when said tractor is backed into attaching position, latch means secured to the transverse member and laterally spaced from said pilot shaft for engaging said plow frame for draft connecting said plow frame to said transverse member, said latch means being constituted to disengage upon relative longitudinal movement between the transverse member and the plow frame in one direction and being disengageable upon attainment of a predetermined load, means for raising and lowering said spaced links and means for raising and lowering one of the links connected to said transverse member independently of the other for tilting said transverse member relative to the tractor, and forwardly open means on said plow frame for snugly receiving said transverse member between said pilot shaft and said latch means when said plow frame is in draft relationship with said transverse member for stabilizing said plow frame for causing tilting of said frame in accordance with adjustment of said transverse member, said means permitting instantaneous relative longitudinal movement between said transverse member and said frame upon the attainment of a predetermined load.

9. In a tractor-mounted plow the combination of a tractor, a plurality of spaced links pivoted to the tractor and extending rearwardly therefrom, a transverse member rearwardly of the tractor and carried on and connecting certain of said links to each other, a mast extending generally upwardly from said transverse member and connected to the tractor by the other of said links, a pilot shaft projecting rearwardly from said transverse member, said plow comprising a plow frame, a plow bottom propelled by and supported on said plow frame, a socket on said plow frame positioned to snugly receive said pilot shaft when said tractor is backed into attaching position, a transverse roller carried by said plow frame, latch means swingably secured to the transverse member and laterally spaced from said pilot shaft for engaging said transverse roller upon being swung rearwardly for draft connecting said plow frame to said transverse member, said latch means being constituted to disengage the transverse roller upon relative longitudinal movement between the transverse member and the plow frame in one direction and being disengageable upon the attainment of a predetermined load, means for raising and lowering said spaced links and means for raising and lowering one of the links connected to said transverse member independently of the other for tilting said transverse member relative to the tractor, and forwardly open means on said plow frame for snugly receiving said transverse member between said latch means and said pilot shaft when said plow frame is in draft relationship with said transverse member for stabilizing said plow frame for permitting tilting of the frame in accordance with adjustment of said transverse member, said means causing instantaneous relative longitudinal movement between said transverse member and said frame upon the attainment of a predetermined load.

10. In a tractor mounted plow the combination of a tractor, a plurality of spaced links pivoted to the tractor and extending rearwardly therefrom, a transverse member rearwardly of the tractor and carried on and connecting certain of said links to each other, a mast extending generally upwardly from said transverse member and connected to the tractor by the other of said links, a pilot shaft projecting rearwardly from said transverse member, said plow comprising a plow frame including at least two forwardly extending plow beams, at least one plow bottom propelled by and supported on one of said plow beams, a brace member secured between said plow beams adjacent the forward end thereof, a socket on said plow frame positioned to receive said pilot shaft when said tractor is backed into attaching position, a transverse roller carried by said brace member, a swingable latch secured to said transverse member for engaging said roller when said plow frame is draft positioned with respect to said transverse member, said latch having a spring-loaded toggle arrangement for urging said latch in draft position and being constituted to disengage said roller upon relative longitudinal movement between the transverse member and the plow frame in one direction and being releasable upon the attainment of a predetermined load, means for raising and lowering said spaced links and means for raising and lowering one of said links connected to said transverse member independently of the other for tilting said transverse member relative to the tractor, and a forwardly open hook secured to said brace member for snugly receiving said transverse member between said hook and said brace member for stabilizing said plow frame for causing tilting of said frame in accordance with adjustment of said transverse member, said means permitting instantaneous relative longitudinal movement in one direction between said transverse member and said plow frame upon the attainment of a predetermined load.

11. In a tractor mounted plow the combination of a tractor, a plurality of spaced links pivoted to the tractor and extending rearwardly therefrom, a transverse member rearwardly of the tractor and carried on and connecting certain of said links to each other, a mast extending generally upwardly from said transverse member and connected to the tractor by the other of said links, a pilot shaft projecting rearwardly from said transverse member, said plow comprising a plow frame including at least two forwardly extending plow beams, at least one plow bottom propelled by and supported on one of said plow beams, a brace member secured between said plow beams adjacent the forward end thereof, a socket on said plow frame positioned to receive said pilot shaft when said tractor is backed into attaching position, a transverse roller carried by said brace member, a latch swingably secured to said transverse member and having a swingable trigger, a spring loaded toggle arrangement for urging said trigger in a cocked position for engaging said roller upon being swung rearwardly for draft connecting said plow frame to said transverse member, said trigger being constituted to disengage said roller upon relative longitudinal movement between the transverse member and the plow frame in one direction and being releasable upon the attainment of a predetermined load, means for raising and lowering said spaced links and means for raising and lowering one of said links connected to said transverse member independently of the other for tilting said transverse member relative to the tractor, and a forwardly open hook secured to said brace member for snugly receiving said transverse member between said hook and said brace member for stabilizing said plow frame for permitting tilting of said frame in accordance with adjustment of said transverse member, said means permitting instantaneous relative longitudinal movement between said transverse member and said plow frame upon the attainment of a predetermined load.

References Cited in the file of this patent

UNITED STATES PATENTS

| | | |
|---|---|---|
| 1,373,971 | Pritzel | Apr. 5, 1921 |
| 2,065,015 | Nielsen | Dec. 22, 1936 |
| 2,309,750 | Carrington | Feb. 2, 1943 |
| 2,505,609 | Ego | Apr. 25, 1950 |
| 2,602,389 | Markel | July 8, 1952 |